US012735535B2

(12) United States Patent
Iwasaki et al.

(10) Patent No.: US 12,735,535 B2
(45) Date of Patent: Sep. 15, 2026

(54) HEAT-CURABLE BISMALEIMIDE RESIN COMPOSITION

(71) Applicant: Shin-Etsu Chemical Co., Ltd., Tokyo (JP)

(72) Inventors: Masayuki Iwasaki, Annaka (JP); Yoshihiro Tsutsumi, Annaka (JP); Naoko Taninaka, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 574 days.

(21) Appl. No.: 18/223,607

(22) Filed: Jul. 19, 2023

(65) Prior Publication Data

US 2024/0084075 A1 Mar. 14, 2024

(30) Foreign Application Priority Data

Aug. 19, 2022 (JP) ................................ 2022-130895

(51) Int. Cl.

*C08G 73/12* (2006.01)
*C08F 222/06* (2006.01)
*C08J 5/24* (2006.01)
*C08L 65/00* (2006.01)

(52) U.S. Cl.

CPC .......... *C08G 73/127* (2013.01); *C08F 222/06* (2013.01); *C08J 5/244* (2021.05); *C08L 65/00* (2013.01); *C08G 2170/00* (2013.01); *C08L 2203/16* (2013.01); *C08L 2203/206* (2013.01)

(58) Field of Classification Search

CPC ... C08G 73/127; C08G 73/1071; C08L 65/00; C08F 222/06

See application file for complete search history.

(56) References Cited

U.S. PATENT DOCUMENTS

| | | | | |
|---|---|---|---|---|
| 10,434,750 | B2 | 10/2019 | Takeuchi et al. | |
| 2011/0120761 | A1 | 5/2011 | Kawai | |
| 2018/0009195 | A1 | 1/2018 | Takeuchi et al. | |
| 2021/0261733 | A1 | 8/2021 | Kuo | |
| 2022/0169791 | A1 * | 6/2022 | Sugawara .......... | C08G 73/1042 |

FOREIGN PATENT DOCUMENTS

| | | | |
|---|---|---|---|
| JP | 2007-254709 | A | 10/2007 |
| JP | 2007-254710 | A | 10/2007 |
| JP | 2011-132507 | A | 7/2011 |
| JP | 2014-95065 | A | 5/2014 |
| JP | 2020-172667 | A | 10/2020 |
| JP | 2021-113303 | A | 8/2021 |
| WO | WO 2016/114287 | A1 | 7/2016 |
| WO | WO 2022/117715 | A1 | 6/2022 |

OTHER PUBLICATIONS

Hu, et al, "Synthesis and Characterization of Novel Chain-Extended Bismaleimides Containing Fluorenyl Cardo Structure," Journal of Applied Polymer Science, vol. 107, 1288-1298 (2008) (Year: 2008).*

Japanese Office Action for Japanese Application No. 2022-130895, dated Mar. 18, 2025, with English translation.

* cited by examiner

*Primary Examiner* — Fred M Teskin

(74) *Attorney, Agent, or Firm* — Birch, Stewart, Kolasch & Birch, LLP

(57) ABSTRACT

Provided is a resin composition capable of being turned into a cured product having a high glass-transition temperature and excellent dielectric properties as well. The resin composition is a heat-curable bismaleimide resin composition containing:

(A) a bismaleimide compound represented by the following formula (1)

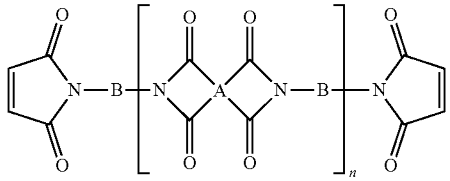

(1)

wherein A independently represents a tetravalent organic group having 4 to 200 carbon atoms, B independently represents a divalent organic group having 2 to 200 carbon atoms, n is 2 to 100, and wherein A and/or B has therein a fluorene frame represented by the following formula (2)

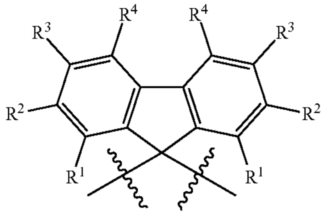

(2)

wherein each of $R^1$, $R^2$, $R^3$ and $R^4$ independently represents a hydrogen atom, an alkyl group having 1 to 5 carbon atoms, a (hetero)aryl group having 4 to 10 carbon atoms, a hydroxyl group, an alkoxy group, a halogeno group, an amino group, or a sulfenyl group; and (B) a reaction accelerator.

8 Claims, No Drawings

HEAT-CURABLE BISMALEIMIDE RESIN COMPOSITION

BACKGROUND OF THE INVENTION

Field of the Invention

The present invention relates to a heat-curable bismaleimide resin composition; and an uncured resin film, cured resin film, prepreg, substrate, adhesive and semiconductor encapsulation material using such resin composition.

Background Art

In recent years, as electronic devices are getting smaller and more sophisticated, multi-layered printed-wiring boards are now required to have fine and high-density wirings. Further, since a material intended for use in a high-frequency band will be needed in the next generation, and since reduction in transmission loss as a countermeasure to noise is critical, the development of an insulating material with excellent dielectric properties is demanded.

As an insulating material for a multi-layered printed-wiring board, there are known epoxy resin compositions containing, for example, an epoxy resin, a particular phenolic curing agent, a phenoxy resin, rubber particles, and polyvinyl acetal resin, such as those disclosed in JP-A-2007-254709 and JP-A-2007-254710; however, it has become clear that these materials are not satisfactory for high-frequency band purposes as typified by the keyword 5G. In this regard, there is a report in JP-A-2011-132507 that shows how an epoxy resin composition containing an epoxy resin, an active ester compound and a triazine-containing cresol novolac resin is effective in achieving a lower dielectric tangent; however, even this material is required to possess even lower dielectric properties if used for high-frequency band purposes.

Meanwhile, in WO2016/114287, there is a report that shows how a resin film comprised of a resin composition containing a long-chain alkyl group-containing bismaleimide resin as a non-epoxy material and a curing agent has excellent dielectric properties; however, since this composition is technically a combination of a long-chain alkyl group-containing bismaleimide resin and a hard low-molecular aromatic maleimide, it is extremely difficult to achieve a high glass-transition temperature (Tg) of 100° C. or higher, which is required if used for substate purposes.

Further, in JP-A-2014-95065, there is proposed a fluorene-containing imide oligomer as a heat resistant plasticizer; however, since this oligomer has no heat curability, there still exists a problem in handling property if used for substrate purposes. JP-A-2021-113303 discloses a fluorene frame-containing heat-curable polyimide; however, this resin exhibits an insufficient curability due to the fact that it has allyl groups as heat-curable functional groups, a limited level of glass-transition temperature, and an insufficient heat resistance.

SUMMARY OF THE INVENTION

Thus, it is an object of the present invention to provide a heat-curable resin composition having excellent dielectric properties such as a low relative permittivity and dielectric tangent in a high-frequency band, and also having an excellent heat resistance.

After diligently conducting a series of studies to solve the above problems, the inventors of the present invention completed the invention by finding out that the following heat-curable fluorene-containing bismaleimide resin composition was able to achieve the abovementioned object.

[1]

A heat-curable bismaleimide resin composition comprising:

(A) a bismaleimide compound represented by the following formula (1)

(1)

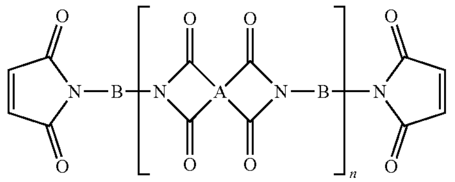

wherein A independently represents a tetravalent organic group having 4 to 200 carbon atoms, B independently represents a divalent organic group having 2 to 200 carbon atoms, n is 2 to 100, and wherein A and/or B has therein a fluorene frame represented by the following formula (2)

(2)

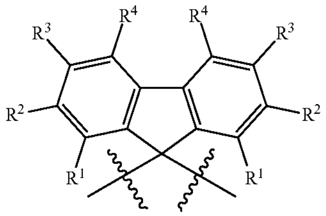

wherein each of $R^1$, $R^2$, $R^3$ and $R^4$ independently represents a hydrogen atom, an alkyl group having 1 to 5 carbon atoms, a (hetero)aryl group having 4 to 10 carbon atoms, a hydroxyl group, an alkoxy group, a halogeno group, an amino group, or a sulfenyl group; and (B) a reaction accelerator.

[2]

The heat-curable bismaleimide resin composition according to [1], wherein the reaction accelerator as the component (B) is a radical polymerization initiating catalyst, or an anionic polymerization initiating catalyst containing one or more kinds of atoms selected from nitrogen atoms and phosphorus atoms.

[3]

The heat-curable bismaleimide resin composition according to [1], wherein a cured product of the heat-curable bismaleimide resin composition has a glass-transition temperature of not lower than 200° C.

[4]

An uncured resin film comprised of the heat-curable bismaleimide resin composition according to any one of [1] to [3].

[5]

A cured resin film comprised of a cured product of the heat-curable bismaleimide resin composition according to any one of [1] to [3].

[6]

A prepreg having the heat-curable bismaleimide resin composition according to any one of [1] to [3] and a fiber base material.

[7]

A substrate comprising the heat-curable bismaleimide resin composition according to any one of [1] to [3].

[8]

An adhesive comprised of the heat-curable bismaleimide resin composition according to any one of [1] to [3].

[9]

A semiconductor encapsulation material comprised of the heat-curable bismaleimide resin composition according to any one of [1] to [3].

As compared to a bismaleimide resin composition having no fluorene frame, the heat-curable bismaleimide resin composition of the present invention, when molded into the shape of a film or substrate, is able to exhibit an even higher glass-transition temperature while maintaining its excellent dielectric properties.

DETAILED DESCRIPTION OF THE INVENTION

The present invention is described in detail hereunder.

(A) Fluorene Frame-Containing Bismaleimide Compound

A component (A) used in the present invention is a bismaleimide compound represented by the following formula (1) in which A and/or B has therein a fluorene frame represented by the following formula (2). Since the bismaleimide compound as the component (A) has a fluorene frame in its molecule, a cured product of a composition containing such bismaleimide compound shall exhibit an excellent heat resistance.

(1)

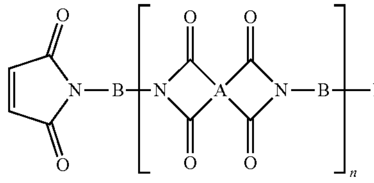

In the formula (1), A independently represents a tetravalent organic group having 4 to 200 carbon atoms; B independently represents a divalent organic group having 2 to 200 carbon atoms; n is 2 to 100.

(2)

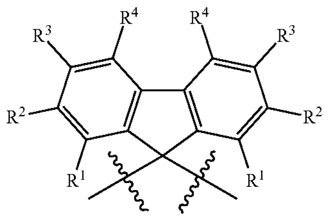

In the formula (2), each of $R^1$, $R^2$, $R^3$ and $R^4$ independently represents a hydrogen atom, an alkyl group having 1 to 5 carbon atoms, a (hetero)aryl group having 4 to 10 carbon atoms, a hydroxyl group, an alkoxy group, a halogeno group, an amino group, or a sulfenyl group.

The fluorene frame represented by the formula (2) may be present in one of A and B in the formula (1), or in both A and B in the formula (1).

As the alkyl group having 1 to 5 carbon atoms, which is represented by each of $R^1$, $R^2$, $R^3$ and $R^4$ in the formula (2), there may be listed, for example, a methyl group, an ethyl group, a n-propyl group, an isopropyl group, a n-butyl group, a sec-butyl group, an isobutyl group, a tert-butyl group, and a pentyl group.

As the (hetero)aryl group having 4 to 10 carbon atoms, which is represented by each of $R^1$, $R^2$, $R^3$ and $R^4$ in the formula (2), there may be listed, for example, aryl groups having 6 to 10 carbon atoms, such as a phenyl group, a tolyl group, a xylyl group, and a naphthyl group; and heteroaryl groups having 4 to 10 carbon atoms, such as a furyl group, a thienyl group, a pyridyl group, and an indolyl group.

As the alkoxy group represented by each of $R^1$, $R^2$, $R^3$ and $R^4$ in the formula (2), there may be listed, for example, a methoxy group, an ethoxy group, a n-propyloxy group, an isopropyloxy group, a n-butyloxy group, an isobutyloxy group, a t-butyloxy group, a n-pentyloxy group, an isopentyloxy group, a hexyloxy group, a benzyloxy group, a phenethyloxy group, an allyloxy group, a phenyloxy group, a tolyloxy group, a xylyloxy group, a naphthyloxy group, a furyloxy group, a thienyloxy group, a pyridyloxy group, and an indolyloxy group.

As the halogeno group represented by each of $R^1$, $R^2$, $R^3$ and $R^4$ in the formula (2), there may be listed, for example, a fluoro group, a chloro group, a bromo group, and an iodo group.

In the formula (1), A independently represents a tetravalent organic group having 4 to 200, preferably 4 to 100, more preferably 4 to 50 carbon atoms. Further, it is preferred that A be an organic group having an aromatic ring or alicyclic structure.

When B in the formula (1) is a fluorene frame-containing group, A in the formula (1) may be a fluorene frame-containing group or a group containing no fluorene frame. When B in the formula (1) is a group containing no fluorene frame, A in the formula (1) is a group having at least one kind of fluorene frame.

Of As in the formula (1), examples of a group containing no fluorene frame include those expressed by the following structural formulae.

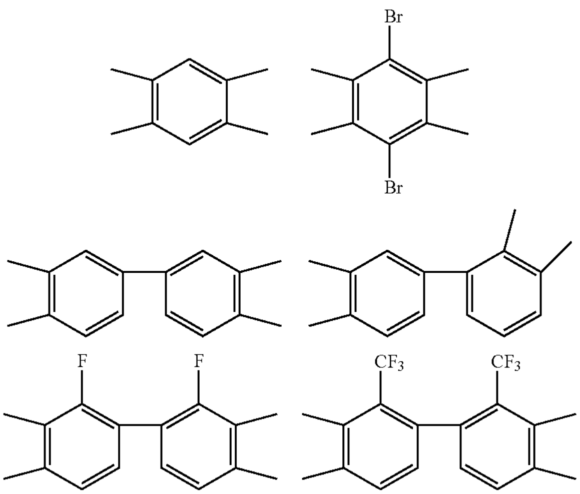

-continued
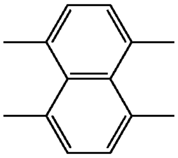
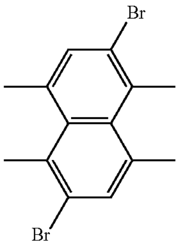
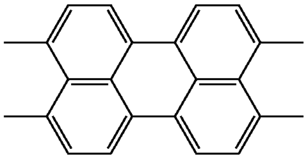
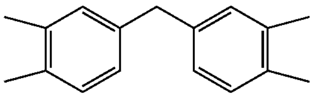
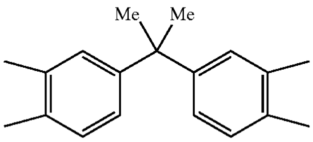
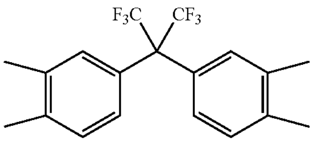
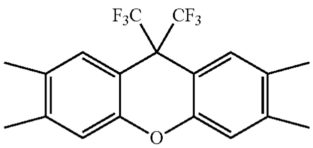
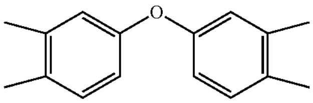
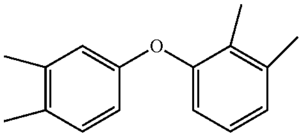
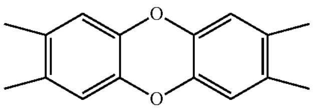
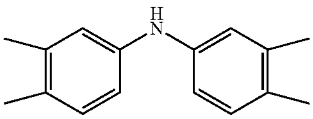
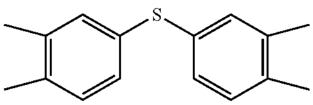
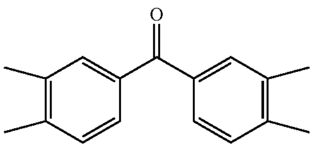
-continued
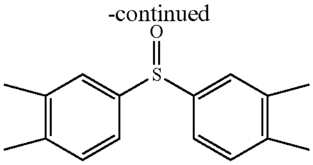
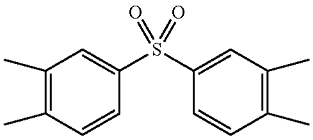
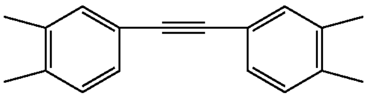
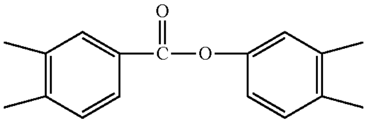
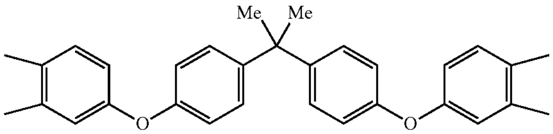
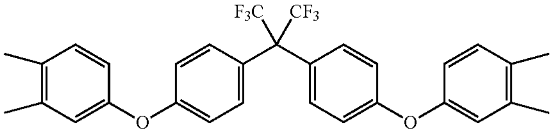
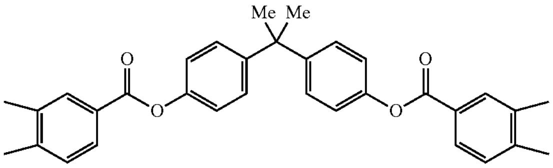
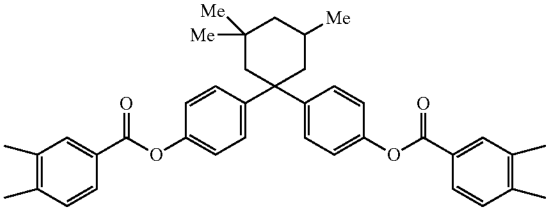
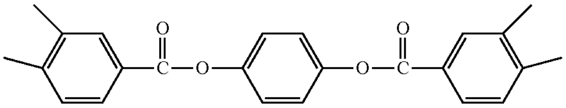
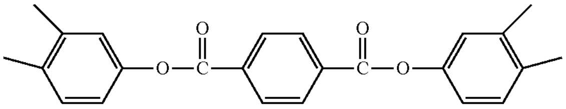
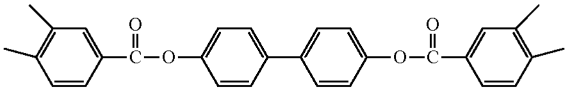
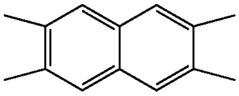
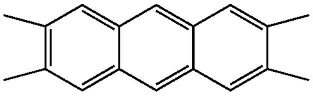
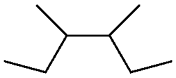
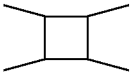
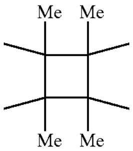

-continued
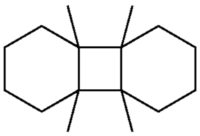
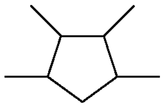
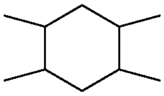
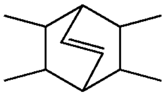
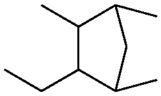
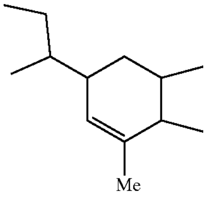
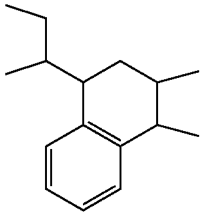
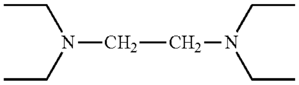
-continued
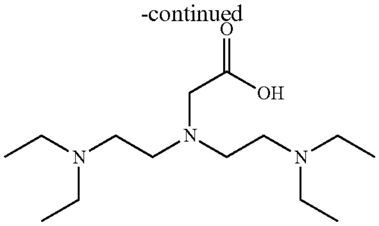
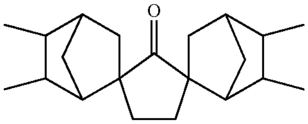
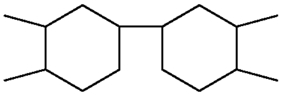
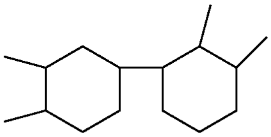
Bonds in the above structural formulae that are yet unbonded to substituent groups are to be bonded to carbonyl carbons forming cyclic imide structures in the formula (1).
Of As in the formula (1), examples of a fluorene frame-containing group include those expressed by the following structural formulae.
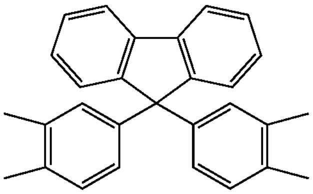
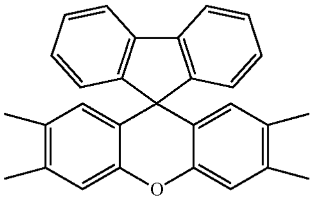
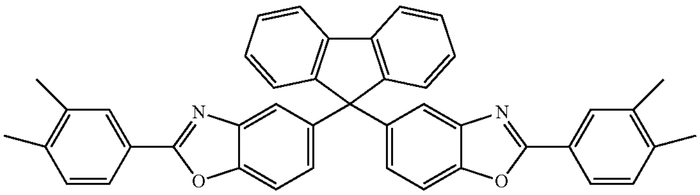
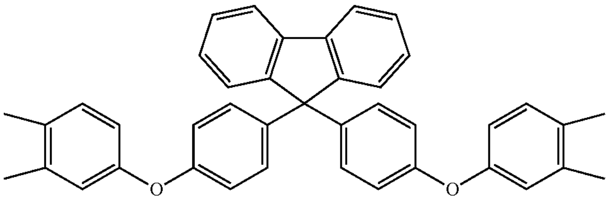
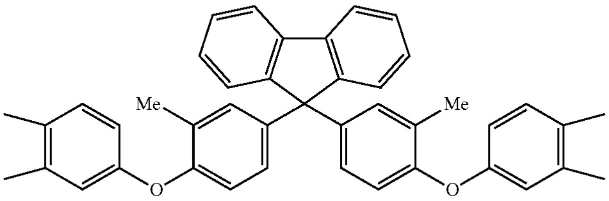
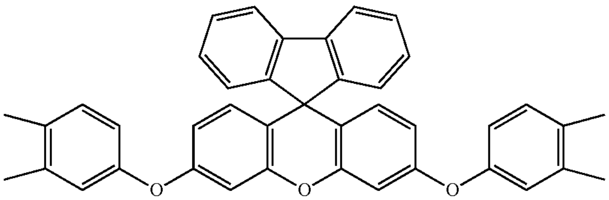

-continued
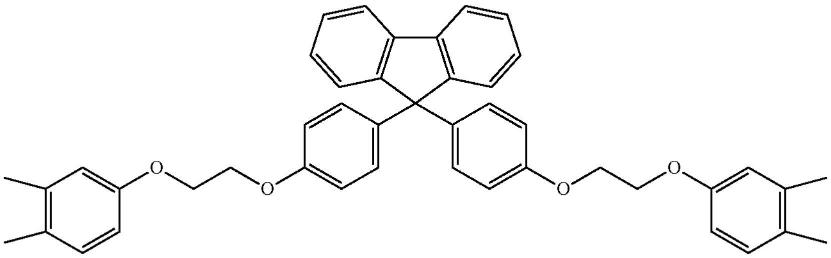
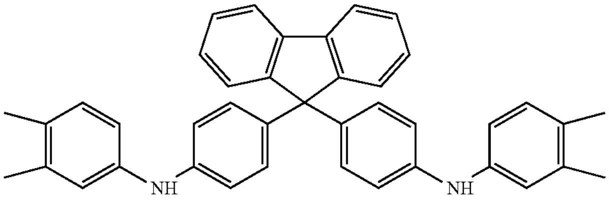
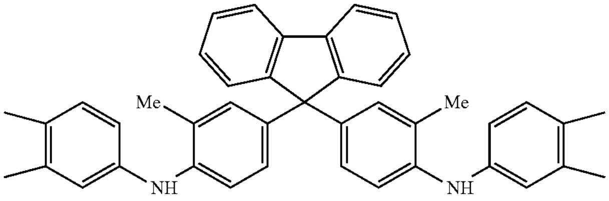
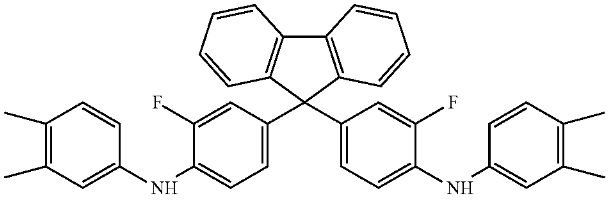
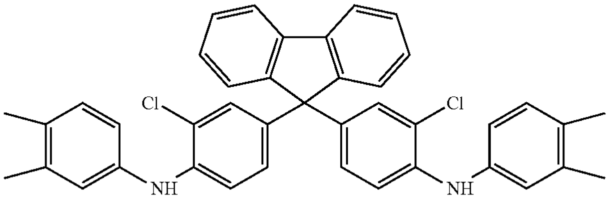
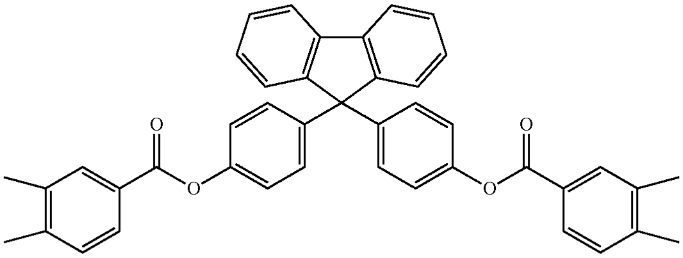
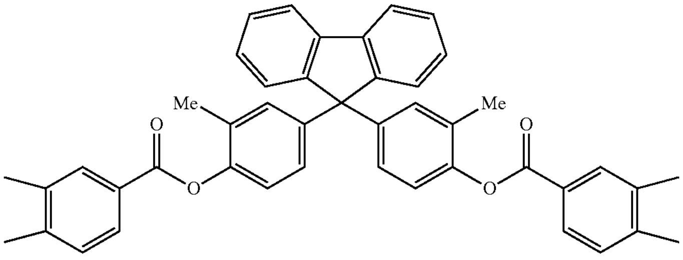

-continued
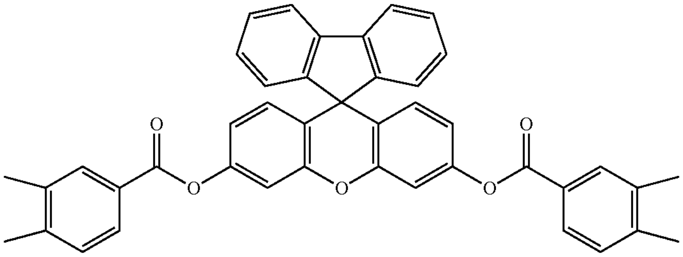
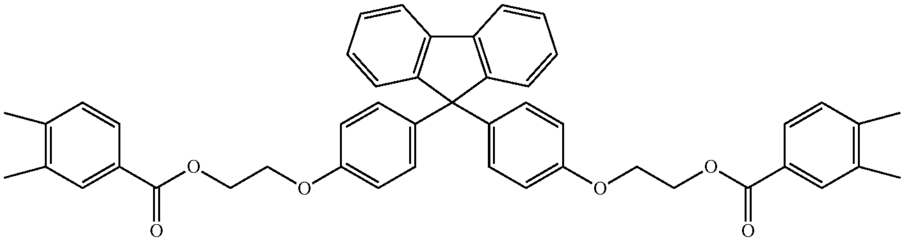
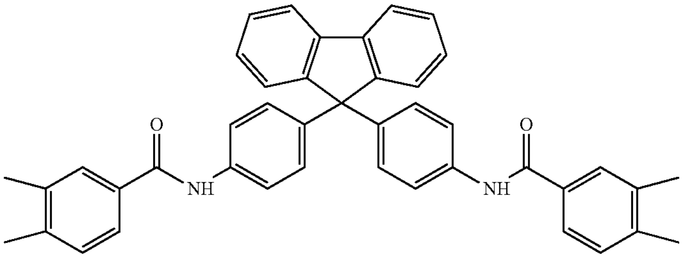
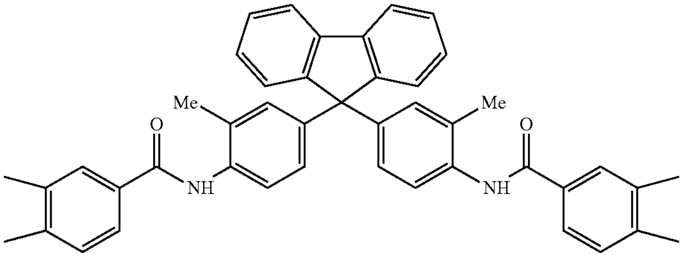
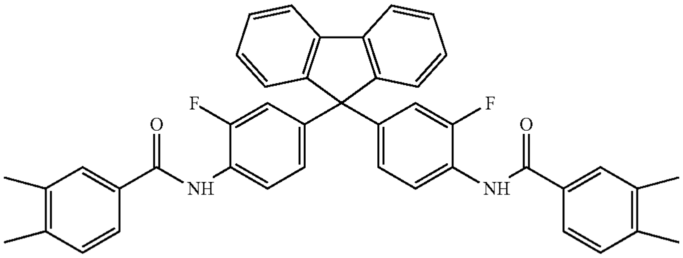
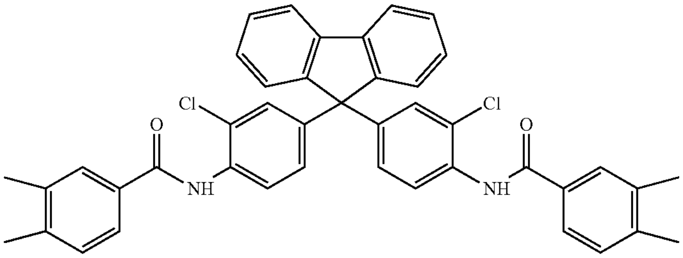

Bonds in the above structural formulae that are yet unbonded to substituent groups are to be bonded to carbonyl carbons forming cyclic imide structures in the formula (1).

Here, there may be one or multiple kinds of A in the formula (1).

Further, in the formula (1), B independently represents a divalent organic group having 2 to 200, preferably 2 to 100, more preferably 2 to 50 carbon atoms.

When A in the formula (1) is a fluorene frame-containing group, B in the formula (1) may be a fluorene frame-containing group or a group containing no fluorene frame. When A in the formula (1) is a group containing no fluorene frame, B in the formula (1) is a group having at least one kind of fluorene frame.

Of Bs in the formula (1), examples of a group containing no fluorene frame include divalent organic groups obtained by removing two amino groups from diamines such as 1,10-diaminodecane, 1,12-diaminododecane, dimer diamine, 1,2-diamino-2-methylpropane, 1,2-diaminocyclohexane, 1,2-diaminopropane, 1,3-diaminopropane, 1,4-diaminobutane, 1,5-diaminopentane, 1,7-diaminoheptane, 1,8-diaminomenthane, 1,8-diaminooctane, 1,9-diaminononane, 3,3'-diamino-N-methyldipropylamine, diaminomaleonitrile, 1,3-diaminopentane, 9,10-diaminophenanthrene, 4,4'-diaminooctafluorobiphenyl, 3,5-diaminobenzoic acid, 4,4'-diaminobenzophenone, 3,4-diaminobenzophenone, 3,4-diaminotoluene, 2,6-diaminoanthraquinone, 2,6-diaminotoluene, 2,3-diaminotoluene, 1,8-diaminonaphthalene, 2,4-diaminotoluene, 2,5-diaminotoluene, 1,4-diaminoanthraquinone, 1,5-diaminoanthraquinone, 1,5-diaminonaphthalene, 1,2-diaminoanthraquinone, 2,4-cumenediamine, 1,3-bis(aminomethyl)benzene(m-xylylenediamine)1,4bis(aminomethyl)benzene (p-xylylenediamine), 1,3-bis(aminomethyl)cyclohexane, 2-chloro-1,4-diaminobenzene, 1,4-diamino-2,5-dichlorobenzene, 1,4-diamino-2,5-dimethylbenzene, 4,4'-diamino-2,2'-bistrifluoromethylbiphenyl, 1,2-bis(4-amino-3-chlorophenyl)ethane, bis(4-amino-3,5-dimethylphenyl)methane, bis(4-amino-3,5-diethylphenyl)methane, 3,4-diaminobenzoic acid, 2,3-diaminonaphthalene, 2,3-diaminophenol, bis (4-amino-3-methylphenyl) methane, bis(4-amino-3-ethylphenyl)methane, 4,4'-diaminophenylsulfone, 3,3'-diaminophenylsulfone, bis(4-(4-aminophenoxy)phenyl) sulfone, bis(4-(3-aminophenoxy)phenyl) sulfone, 4,4'-oxydianiline, 4,4'-diaminodiphenylsulfide, 3,4'-oxydianiline, 2,2-bis(4-(4-aminophenoxy)phenyl)propane, 1,3-bis(4-aminophenoxy)benzene, 4,4'-bis(4-aminophenoxy)biphenyl, 4,4'-diamino-3,3'-dihydroxybiphenyl, 4,4'-diamino-3,3'-dimethylbiphenyl, 4,4'-diamino-3,3'-dimethoxybiphenyl, bisaniline M (1,3-bis[2-(4-aminophenyl)-2-propyl]benzene), bisaniline P (1,4-bis[2-(4-aminophenyl)-2-propyl]benzene), o-tolidinesulfone, methylenebis (anthranilic acid), 1,3-bis(4-aminophenoxy)-2,2-dimethylpropane, 1,3-bis(4-aminophenoxy)propane, 1,4-bis (4-aminophenoxy)butane, 1,5-bis(4-aminophenoxy) pentane, 2,3,5,6-tetramethyl-1,4-phenylenediamine, 3,3',5,5'-tetramethylbenzidine, 4,4'-diaminobenzanilide, 2,2-bis(4-aminophenyl)hexafluoropropane, polyoxyalkylenediamines (e.g. JEFFAMINE (registered trademark) by Huntsman Corporation, D-230, D-400, D-2000 and D-4000), bis(4-amino-3-methylcyclohexyl)methane, 1,2-bis(2-aminoethoxy)ethane, and 3(4),8(9)-bis(aminomethyl)tricyclo[5.2.1.0(2,6)] decane. In terms of improving heat resistance, as B which is the divalent organic group having 2 to 200 carbon atoms, preferred is a divalent organic group having an aromatic ring or alicyclic structure. For example, there may be listed the divalent organic groups expressed by the following structural formulae.

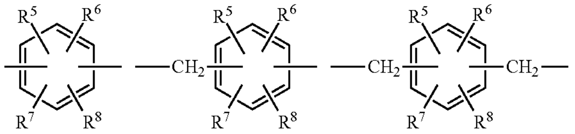
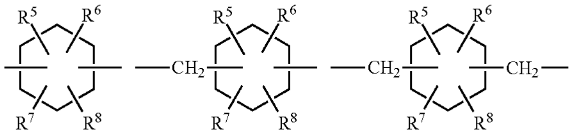
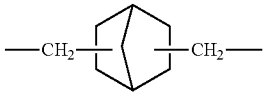
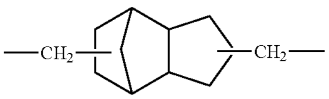
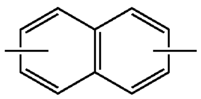
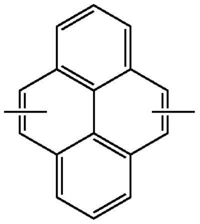
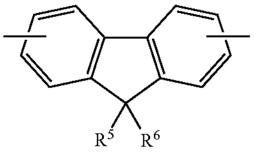
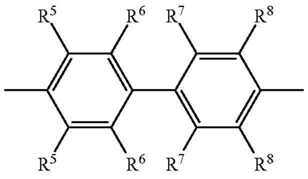
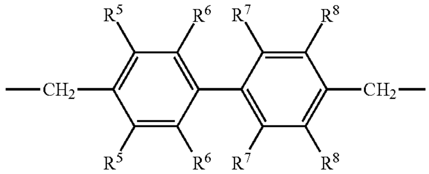
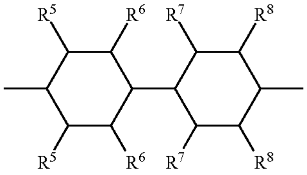
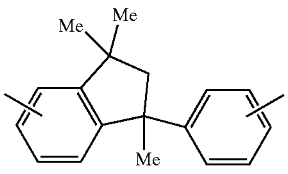
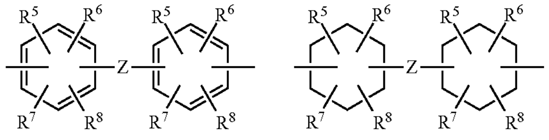

-continued

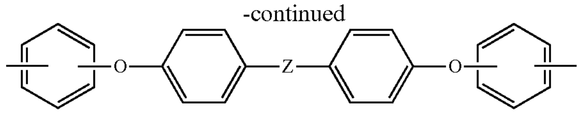

Here, each of $R^5$, $R^6$, $R^7$ and $R^8$ independently represents a hydrogen atom, an alkyl group having 1 to 5 carbon atoms, a methoxy group, a fluoro group, a chloro group, a bromo group, or a trifluoromethyl group; Z independently represents a divalent organic group selected from those expressed by the following formulae; a is a number of 0 to 6.

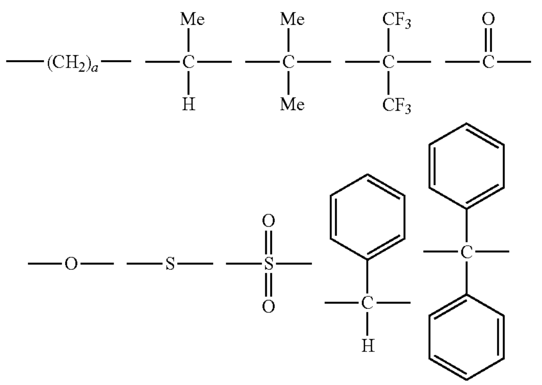

-continued

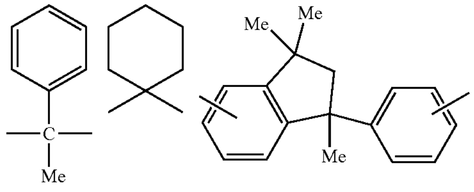

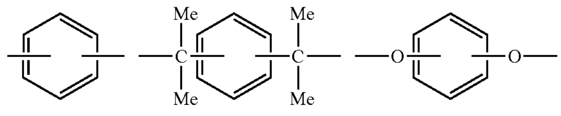

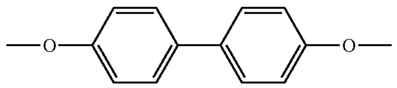

Of Bs in the formula (1), examples of a fluorene frame-containing group include those expressed by the following structural formulae.

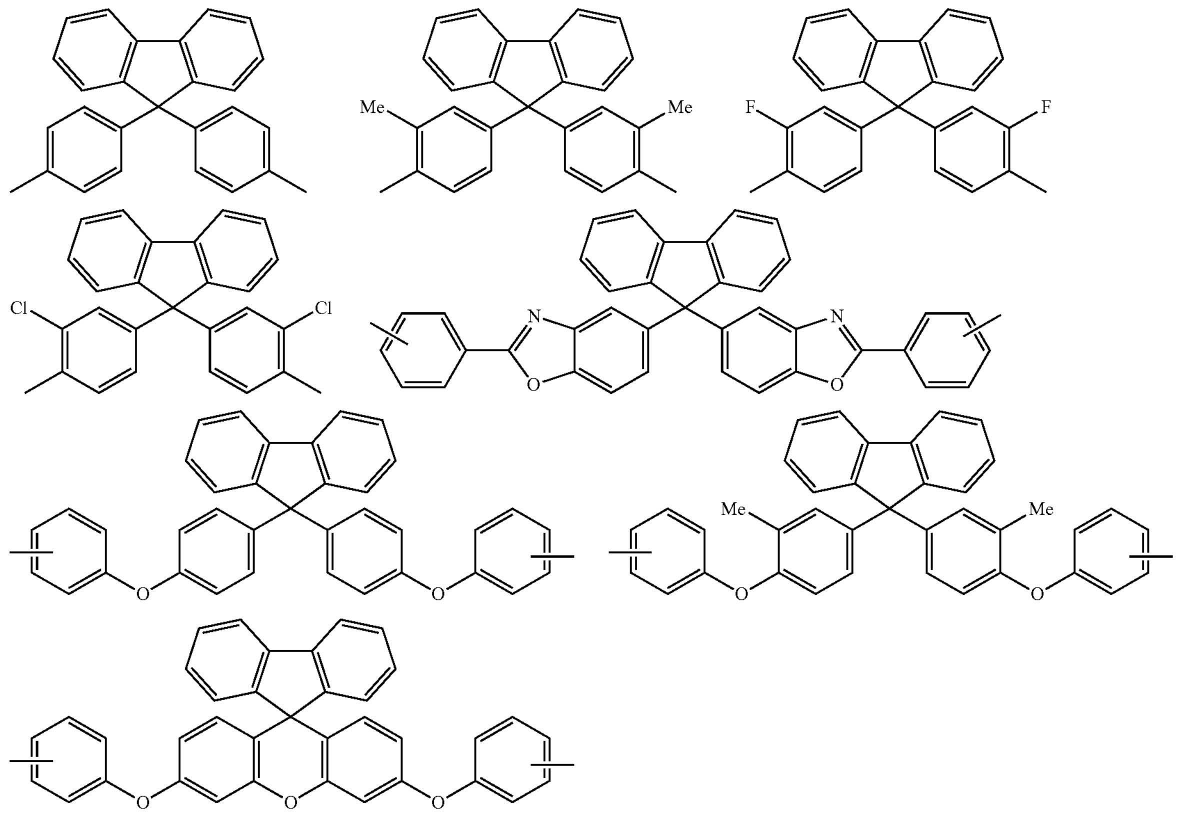

-continued
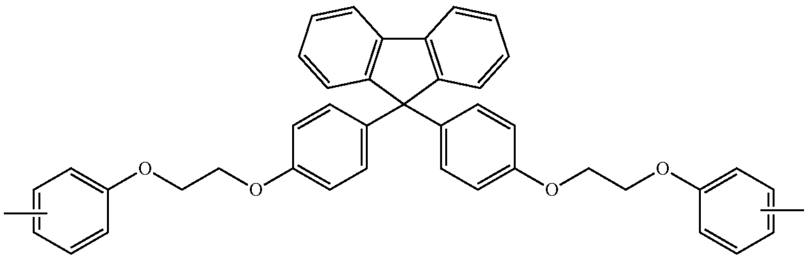
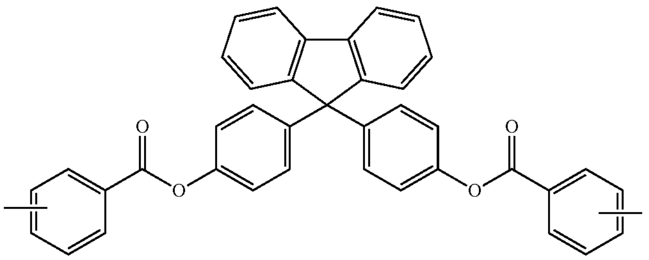
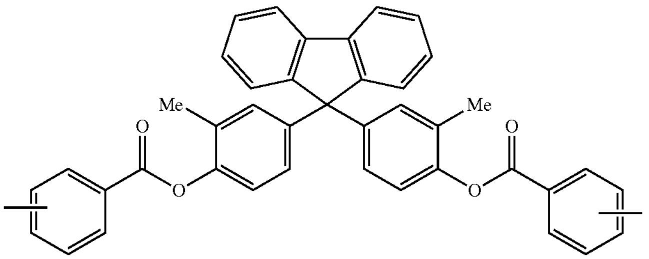
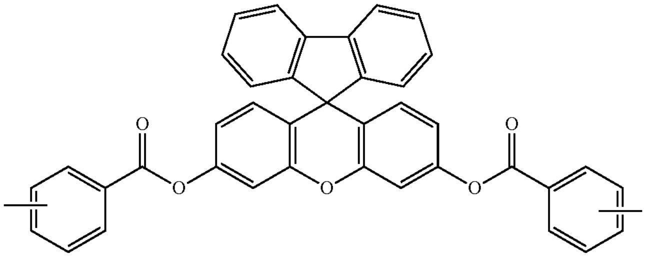
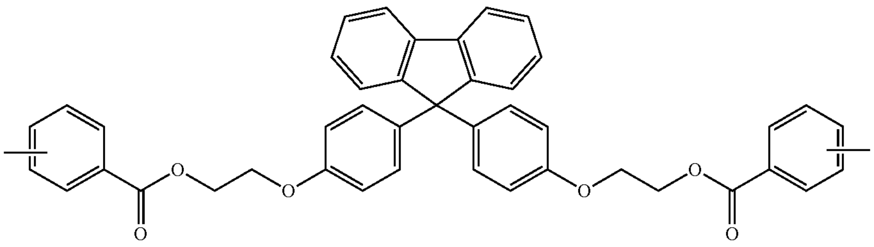
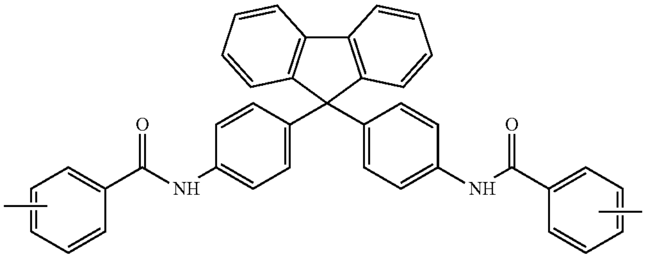

-continued

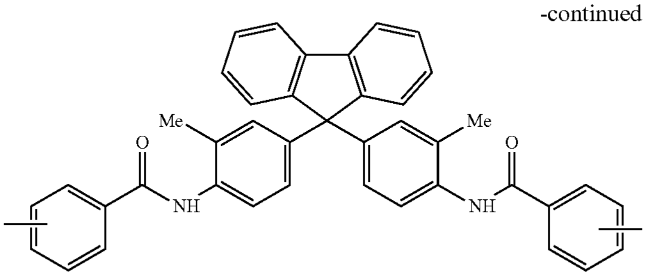

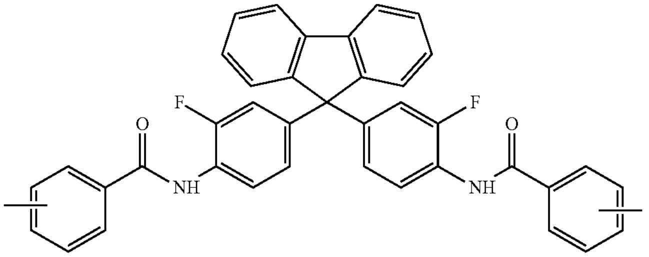

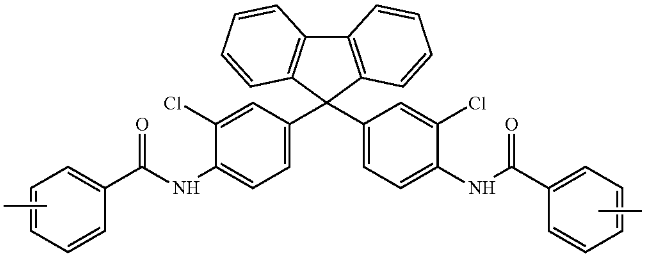

Bonds in the above structural formulae that are yet unbonded to substituent groups are to be bonded to nitrogen atoms forming cyclic imide structures in the formula (1).

Here, there may be one or multiple kinds of B in the formula (1).

Further, in the formula (1), n is 2 to 100, preferably 2 to 80, more preferably 2 to 50.

There are no particular restrictions on the properties of the fluorene frame-containing bismaleimide compound as the component (A) at room temperature and the number average molecular weight thereof; it is preferred that the number average molecular weight of this compound be 3,000 to 50,000, more preferably 5,000 to 50,000, even more preferably 8,000 to 50,000. It is preferred if the number average molecular weight is within these ranges, because the viscosity of a resin composition containing such compound will not be excessively high, and the cured product of such resin composition will exhibit a high strength. Here, in this specification, the number average molecular weight (Mn) is a number average molecular weight in terms of polystyrene, that is measured by gel permeation chromatography (GPC) under the following conditions.

[GPC Measurement Conditions]

Developing solvent: Tetrahydrofuran (THF)

Flow rate: 0.35 mL/min

Detector: Differential refractive index detector (RI)

Column: TSK Guardcolumn Super H-L

TSK gel Super HZ4000 (4.6 mm I.D.×15 cm×1)

TSK gel Super HZ3000 (4.6 mm I.D.×15 cm×1)

TSK gel Super HZ2000 (4.6 mm I.D.×15 cm×2)

(all Manufactured by Tosoh Corporation)

Column temperature: 40° C.

Sample injection volume: 5 μL (THF solution with a concentration of 0.2% by mass)

There are no particular restrictions on a method for producing the component (A); for example, the component (A) can be efficiently produced by changing a diamine compound as a raw material, in accordance with a method described in JP-A-2022-77847.

(B) Reaction Accelerator

A component (B) used in the present invention is a reaction accelerator.

The reaction accelerator as the component (B) used in the present invention is added to initiate and promote a radical polymerization reaction or anionic polymerization reaction of the fluorene frame-containing bismaleimide compound as the component (A).

There are no particular restrictions on the component (B) so long as it is capable of promoting such reaction; from the perspective of reaction mechanism, it is preferred that there be used a radical polymerization initiating catalyst such as an organic peroxide, or an anionic polymerization initiating catalyst containing one or more kinds of atoms selected from nitrogen atoms and phosphorus atoms.

Examples of a radical polymerization initiating catalyst include dicumyl peroxide, di-tert-butyl peroxide, 2,5-dimethyl-2,5-di-(tert-butylperoxy)hexane, 2,5-dimethyl-2,5-di (tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butyl peroxybenzoate, tert-butylperoxyisopropyl carbonate, diacetyl peroxide, lauroyl peroxide, and tert-butyl cumyl peroxide.

Examples of an anionic polymerization initiating catalyst include ion catalysts such as imidazoles (e.g. 2-ethyl-4-methylimidazole), tertiary amines, quaternary ammonium salts, a boron trifluoride amine complex, organophosphines (e.g. triphenylphosphine), and an organophosphonium salt.

One kind of the reaction accelerator as the component (B) may be used alone, or two or more kinds thereof may be used in combination.

The reaction accelerator as the component (B) is added in an amount of 0.01 to 10 parts by mass, particularly preferably 0.1 to 5 parts by mass, per 100 parts by mass of the component (A). When the component (B) is contained in an amount larger than these ranges, unreacted component (B) will remain, which may lead to deteriorated dielectric properties. Conversely, if the component (B) is contained in an amount smaller than these ranges, curing will proceed in an insufficient manner, which may lead to a concern that dielectric properties and heat resistance will deteriorate.

Further, it is not preferable if the amount of the component (B) added is out of the above ranges, because curing may take place either extremely slowly or quickly at the time of molding a heat-curable bismaleimide resin composition, and a cured product obtained may exhibit a poor balance between heat resistance and moisture resistance.

As for the amount of the component (A) contained in the heat-curable bismaleimide resin composition of the present invention, it is preferred that the component (A) be added in an amount of 5 to 99.99% by mass, more preferably 10 to 99.9% by mass, per the total mass of the composition.

Since the heat-curable bismaleimide resin composition of the present invention contains the component (A) having a robust fluorene frame, the glass-transition temperature of the cured product is not lower than 200° C., preferably not lower than 210° C.

Other Additives

If necessary, the heat-curable fluorene-containing bismaleimide resin composition of the present invention may further contain various additives within the scope of not impairing the effects of the present invention. These additives are exemplified below.

Heat-curable resin having reactive groups capable of reacting with maleimide groups.

In the present invention, there may further be added a heat-curable resin having reactive groups capable of reacting with maleimide groups.

As reactive groups capable of reacting with maleimide groups, there may be listed, for example, an epoxy group, a hydroxyl group, an amino group, an alkenyl group such as an allyl group and a vinyl group, a (meth)acryloyl group, and a thiol group.

Further, there are no restrictions on the type of such reactive group-containing heat-curable resin, examples of which may include various resins such as a maleimide resin other than the component (A), an epoxy resin, a phenolic resin, a melamine resin, a urea resin, a silicone resin, a modified polyphenylene ether resin, a heat-curable acrylic resin, and a multifunctional thiol. As for such heat-curable resin having reactive groups capable of reacting with maleimide groups, there may be added one or multiple kinds thereof.

The heat-curable resin having reactive groups capable of reacting with maleimide groups is added in an amount of 0 to 30% by mass, preferably 0 to 20% by mass, per a sum total of the component (A) and such heat-curable resin having reactive groups capable of reacting with maleimide groups.

Inorganic Filler

In the present invention, there may further be added an inorganic filler if necessary. An inorganic filler is added to improve the strength and rigidity of the cured product of the heat-curable fluorene-containing bismaleimide resin composition of the present invention, or adjust a thermal expansion coefficient and the dimension stability of the cured product. As such inorganic filler, there may be used those that are generally added to an epoxy resin composition or a silicone resin composition. There may be listed, for example, silicas such as a spherical silica, a molten silica and a crystalline silica; alumina; silicon nitride; aluminum nitride; boron nitride; barium sulfate; talc; clay; aluminum hydroxide; magnesium hydroxide; calcium carbonate; glass fibers; and glass particles. Further, for the sake of improving dielectric properties, there may also be used a fluorine-containing resin, a coating filler and/or hollow particles; and for the sake of for example imparting an electric conductivity, there may also be added metal particles, metal-coated inorganic particles, carbon fibers and carbon nanotubes. There may be added one or multiple kinds of inorganic filler.

There are no particular restrictions on the average particle size and shape of the inorganic filler; if molding an underfill material, a film or a substrate, a spherical silica with an average particle size of 0.5 to 5 μm is particularly preferred; for adhesive and semiconductor encapsulation material purposes, a spherical silica with an average particle size of 3 to 45 μm is preferred. Here, an average particle size is a value obtained as a mass average value $D_{50}$ (or median size) in a particle size distribution measurement conducted by a laser diffraction method.

There are no particular restrictions on the amount of the inorganic filler added; it is preferred that the inorganic filler be added in an amount of 5 to 3,000 parts by mass, more preferably 10 to 2,500 parts by mass, even more preferably 50 to 2,000 parts by mass, per 100 parts by mass of the component (A). When the amount of the inorganic filler added is within these ranges, the function of the inorganic particles can be fully exerted while allowing the resin composition to maintain its strength.

Further, for the sake of property improvement, it is preferred that the inorganic filler be one that has already been surface-treated with a silane coupling agent having organic groups capable of reacting with maleimide groups. Examples of such silane coupling agent include an epoxy group-containing alkoxysilane, an amino group-containing alkoxysilane, a (meth)acryloyl group-containing alkoxysilane, and an alkenyl group-containing alkoxysilane.

As such silane coupling agent, preferred are a (meth) acryloyl group- and/or an amino group-containing alkoxysilane, specific examples of which include 3-methacryloxypropyltrimethoxysilane, 3-acryloxypropyltrimethoxysilane, N-phenyl-3-aminopropyltrimethoxysilane, N-2-(aminoethyl)-3-aminopropyltrimethoxysilane, and 3-aminopropyltrimethoxysilane.

Others

In addition to the above additives, there may also be added, for example, a non-functional silicone oil, a thermoplastic resin, a thermoplastic elastomer, an organic synthetic rubber, a photosensitizer, a light stabilizer, a polymerization inhibitor, a flame retardant, a pigment, a dye, and an adhesion aid; an ion-trapping agent or the like may also be added for the purpose of improving electric properties.

Production Method

As a method for producing the resin composition of the present invention, there may be employed a method where the components (A) and (B) as well as other additives if needed are added and then mixed by, for example, a planetary mixer, a stirrer or the like.

The heat-curable bismaleimide resin composition of the present invention may also be handled as a varnish after being dissolved into an organic solvent. By turning the composition into a varnish, a film can be formed easily, and a glass cloth made of an E glass, a low-dielectric glass, a quartz glass or the like can be easily coated and impregnated therewith, which allows a prepreg to be produced easily. There are no restrictions on the organic solvent so long as it is capable of dissolving the component (A).

As for the heat-curable bismaleimide resin composition of the present invention, an uncured resin sheet or an uncured resin film can be obtained by applying the varnish to a base material and then removing the solvent, and a cured resin sheet or a cured resin film can be obtained by further curing the uncured resin sheet or film. Examples of a method for producing the sheet and film include, but are not limited to those described below.

For example, after applying to a base material the heat-curable bismaleimide resin composition dissolved in the organic solvent, the organic solvent is eliminated by performing heating at a temperature of normally not lower than 80° C., preferably not lower than 100° C. for 0.5 to 5 hours, and a strong cured maleimide resin film with a flat surface can then be formed by further performing heating at a temperature of not lower than 130° C., preferably not lower than 150° C. for 0.5 to 10 hours.

The temperature in the drying step for eliminating the organic solvent and the temperature in the subsequent heating and curing step may each be a constant temperature; it is preferred that these temperatures be raised in a step-wise manner. Thus, not only the organic solvent can be efficiently eliminated out of the composition, but the curing reaction of the resins can also take place efficiently.

Examples of a coating method may include those employing a spin coater, a slit coater, a sprayer, a dip coater and a bar coater; there are no particular restrictions on such method.

As a base material, there may be used a general material, examples of which include polyolefin resins such as a polyethylene (PE) resin, a polypropylene (PP) resin and a polystyrene (PS) resin; and polyester resins such as a polyethylene terephthalate (PET) resin, a polybutylene terephthalate (PBT) resin and a polycarbonate (PC) resin. The surface of such base material may also be subjected to a mold release treatment. Further, there are no particular restrictions on the thickness of a coating layer; a thickness after distilling away the solvent is 1 to 100 μm, preferably 3 to 80 μm. A cover film may also be provided on such coating layer.

Instead, the uncured resin film (uncured resin sheet) or cured resin film (cured resin sheet) may also be produced by previously and preliminarily mixing the components, and then extruding the mixture into the shape of a sheet or a film with a melt-kneading machine.

If using the heat-curable bismaleimide resin composition of the present invention as a semiconductor encapsulation material, the components (A) and (B) as well as other components if needed may be combined at given compounding ratios, and a mixer or the like may then be used to sufficiently uniformly mix them, after which the components may be melt-mixed using a heated roller, a kneader, an extruder or the like, followed by cooling the mixture so as to solidify the same before crushing it into an appropriate size(s). The resin composition obtained can be used as an encapsulation material.

If using the heat-curable bismaleimide resin composition of the present invention as an adhesive, the components (A) and (B) as well as other components if needed may be combined at given compounding ratios, and a mixer such as a planetary mixer or the like may then be used to mix them, after which the components may be kneaded and mixed using a triple roll mill for the purpose of improving dispersibility, as appropriate. The resin composition obtained can be used as an adhesive.

As a general molding method using a semiconductor encapsulation material, there may be employed, for example, a transfer molding method or a compression molding method. In a transfer molding method, a transfer molding machine is used, where at a molding pressure of 5 to 20 $N/mm^2$, molding is carried out at a molding temperature of 120 to 190° C. for a molding time of 30 to 500 sec, preferably at a molding temperature of 150 to 185° C. for a molding time of 30 to 180 sec. Further, in a compression molding method, a compression molding machine is used, where molding is carried out at a molding temperature of 120 to 190° C. for a molding time of 30 to 600 sec, preferably at a molding temperature of 130 to 160° C. for a molding time of 120 to 300 sec. Furthermore, in either molding method, post curing may be performed at 150 to 225° C. for 0.5 to 20 hours.

Prepreg

A prepreg of one embodiment of the present invention has the heat-curable bismaleimide resin composition of the present invention and a fiber base material. The heat-curable bismaleimide resin composition in the prepreg may be a semi-cured product of such resin composition.

Here, a semi-cured product refers to a product of a state where the resin composition has been incompletely cured to the extent that the composition can actually be further cured. That is, the semi-cured product is a product of a state where the resin composition has been semi-cured i.e. a B-staged product. Meanwhile, an uncured state may also be referred to as A-stage.

As described above, the fiber base material may for example be an E glass, a low-dielectric glass, a quartz glass, or even an S glass or T glass; while there may be employed any type of glass, a quartz glass cloth having a low relative permittivity and dielectric tangent is preferred in terms of taking advantage of the properties of the heat-curable maleimide resin composition of the present invention. Here, the thickness of a generally used fiber base material is, for example, not smaller than 0.01 mm and not larger than 0.3 mm.

When producing the prepreg, it is preferred that the heat-curable bismaleimide resin composition be a resin varnish prepared in the form of a varnish, because the fiber base material as a base material for forming the prepreg is to be impregnated with the resin composition. Such resin composition in the form of a varnish (i.e. resin varnish) may for example be prepared as follows.

At first, components in the composition of the resin composition that are soluble in the organic solvent are to be added to the organic solvent to dissolve them. At that time, heating may also be performed if necessary. Next, components that are insoluble in the organic solvent, such as the inorganic filler used as needed are added, followed by using a ball mill, a bead mill, a planetary mixer, a roll mill or the like to disperse them until a given dispersed state has been reached, thereby obtaining the resin composition in the form of a varnish (i.e. resin varnish). There are no particular restrictions on the organic solvent used here so long as the organic solvent employed does not inhibit the curing reaction. Specific examples thereof include toluene, methyl ethyl ketone (MEK), xylene and anisole.

Next, after impregnating the fiber base material with the resin composition in the form of a varnish (i.e. resin varnish) by performing, for example, dipping and coating, the fiber base material is then dried.

If necessary, the fiber base material may be repeatedly impregnated several times. Further, at that time, it is also possible to repeat impregnation using multiple resin compositions with different compositions and concentrations, whereby the composition and impregnation amount can eventually be adjusted to desired ones. The fiber base material impregnated with the resin composition (resin varnish) is to be heated under a desired heating condition(s) e.g. at 80 to 400° C. for 1 min to 2 hours. By heating, there can be obtained a prepreg having an uncured (A-staged) or semi-cured (B-staged) heat-curable bismaleimide resin composition.

Substrate

The prepreg and a copper foil may be stacked, pressed and heated so as to be cured, whereby the cured product can then be used as a substrate.

There are no particular restrictions on a method for producing the substrate; for example, the substrate may be produced in such a manner that there are used 1 to 20, preferably 2 to 10 pieces of the abovementioned prepreg, followed by placing a copper foil on one or both surfaces thereof before curing them by pressing and heating.

There are no particular restrictions on the thickness of the copper foil; it is preferred that the copper foil have a thickness of 3 to 70 μm, more preferably 10 to 50 μm, even more preferably 15 to 40 μm. If the thickness of the copper foil is within these ranges, there can be molded a multi-layered substrate possessing a high reliability.

There are no particular restrictions on a condition(s) for molding the substrate; for example, molding may be performed at a temperature of 100 to 400° C. and a pressure of 1 to 100 MPa for a heating period of 0.1 to 4 hours, using a multistage pressing machine, a multistage vacuum pressing machine, a continuous molding machine, an autoclave molding machine or the like. Further, the substrate can also be molded by combining and molding the prepreg(s) of the present invention, a copper foil, and a wiring board for inner layers.

WORKING EXAMPLES

The present invention is described in detail hereunder with reference to working and comparative examples; the present invention shall not be limited to the following working examples. Here, in the working and comparative examples, "room temperature" refers to 25° C.

[Working Example 1](Production of Bismaleimide Compound 1, Reaction Formula 1)

An amic acid was synthesized by adding 27.96 g (52.5 mmol) of 9,9-bis[4-(4-aminophenoxy) phenyl]fluorene, 32.13 g (50.0 mmol) of 9,9-bis[4-(3,4-dicarboxyphenoxy) phenyl]fluorene dianhydride and 137 g of anisole to a 500 mL glass three-necked flask equipped with a stirrer, a Dean-Stark apparatus, a cooling condenser and a thermometer, and then by stirring them at 70° C. for 2 hours. Next, the temperature was directly raised to 150° C., where stirring was performed for 5 hours while distilling away water generated as a by-product, thereby synthesizing a polyimide compound.

Next, 0.54 g (5.5 mmol) of maleic anhydride was added to the flask containing the polyimide solution that had been cooled to room temperature, where the polyimide solution was stirred at room temperature for an hour to synthesize an amic acid. Next, the temperature was directly raised to 150° C., where stirring was performed for 6 hours while distilling away water generated as a by-product, thereby obtaining a target bismaleimide compound 1 (number average molecular weight: 32,000) represented by a formula (3) of the following reaction formula 1 as a red brown varnish.

(Reaction formula 1)
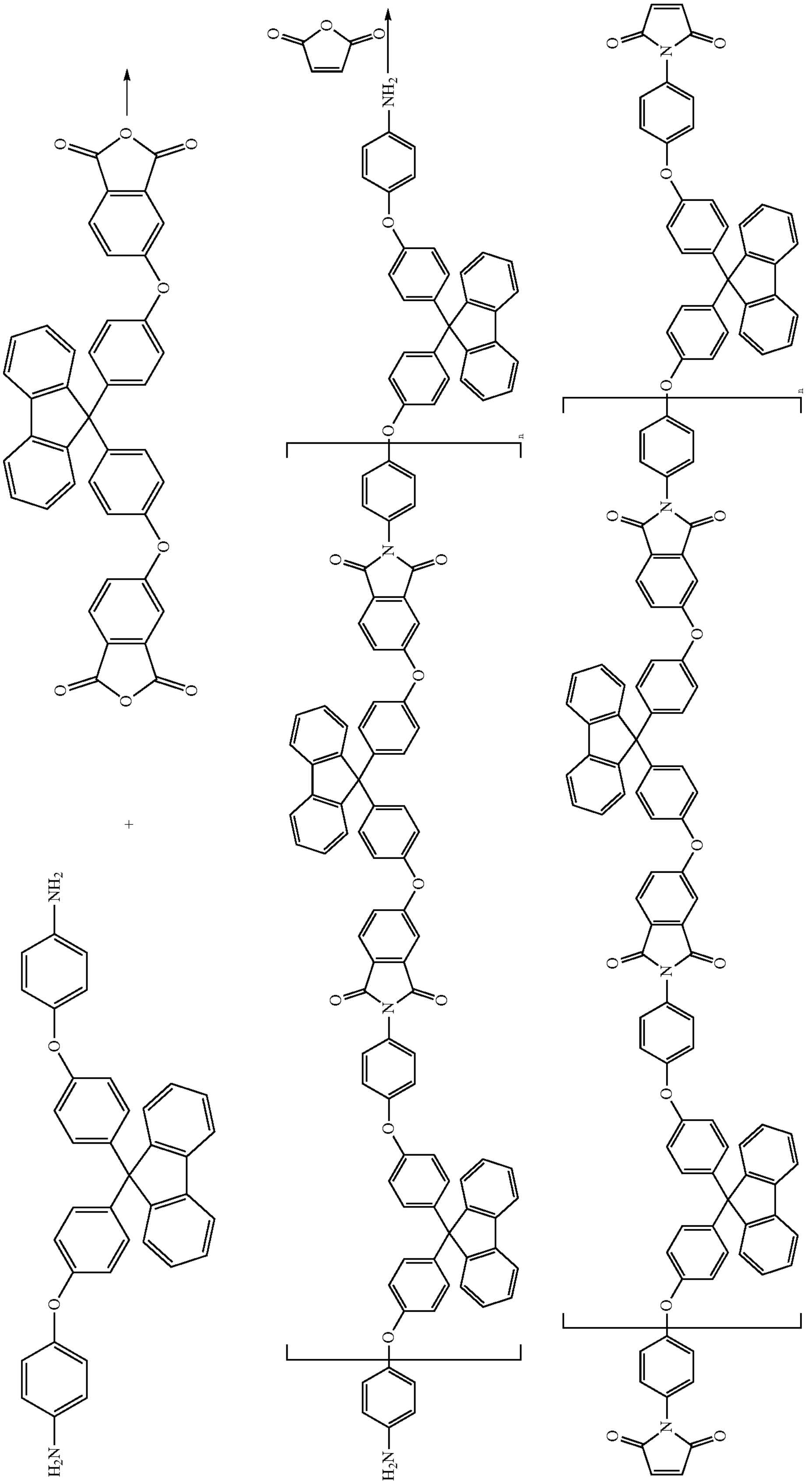
(3)
n ≈ 27 (Average value)

[Working Example 2](Production of Bismaleimide Compound 2, Reaction Formula 2)

An amic acid was synthesized by adding 27.96 g (52.5 mmol) of 9,9-bis[4-(4-aminophenoxy) phenyl]fluorene, 26.02 g (50.0 mmol) of 4,4'-(4,4'-isopropylidenediphenoxy) bis(phthalic anhydride) and 98 g of anisole to a 500 mL glass three-necked flask equipped with a stirrer, a Dean-Stark apparatus, a cooling condenser and a thermometer, and then by stirring them at 70° C. for 2 hours. Next, the temperature was directly raised to 150° C., where stirring was performed for 5 hours while distilling away water generated as a by-product, thereby synthesizing a polyimide compound.

Next, 0.54 g (5.5 mmol) of maleic anhydride was added to the flask containing the polyimide solution that had been cooled to room temperature, where the polyimide solution was stirred at room temperature for an hour to synthesize an amic acid. Next, the temperature was directly raised to 150° C., where stirring was performed for 6 hours while distilling away water generated as a by-product, thereby obtaining a target bismaleimide compound 2 (number average molecular weight: 21,000) represented by a formula (4) of the following reaction formula 2 as a yellow varnish.

(Reaction formula 2)
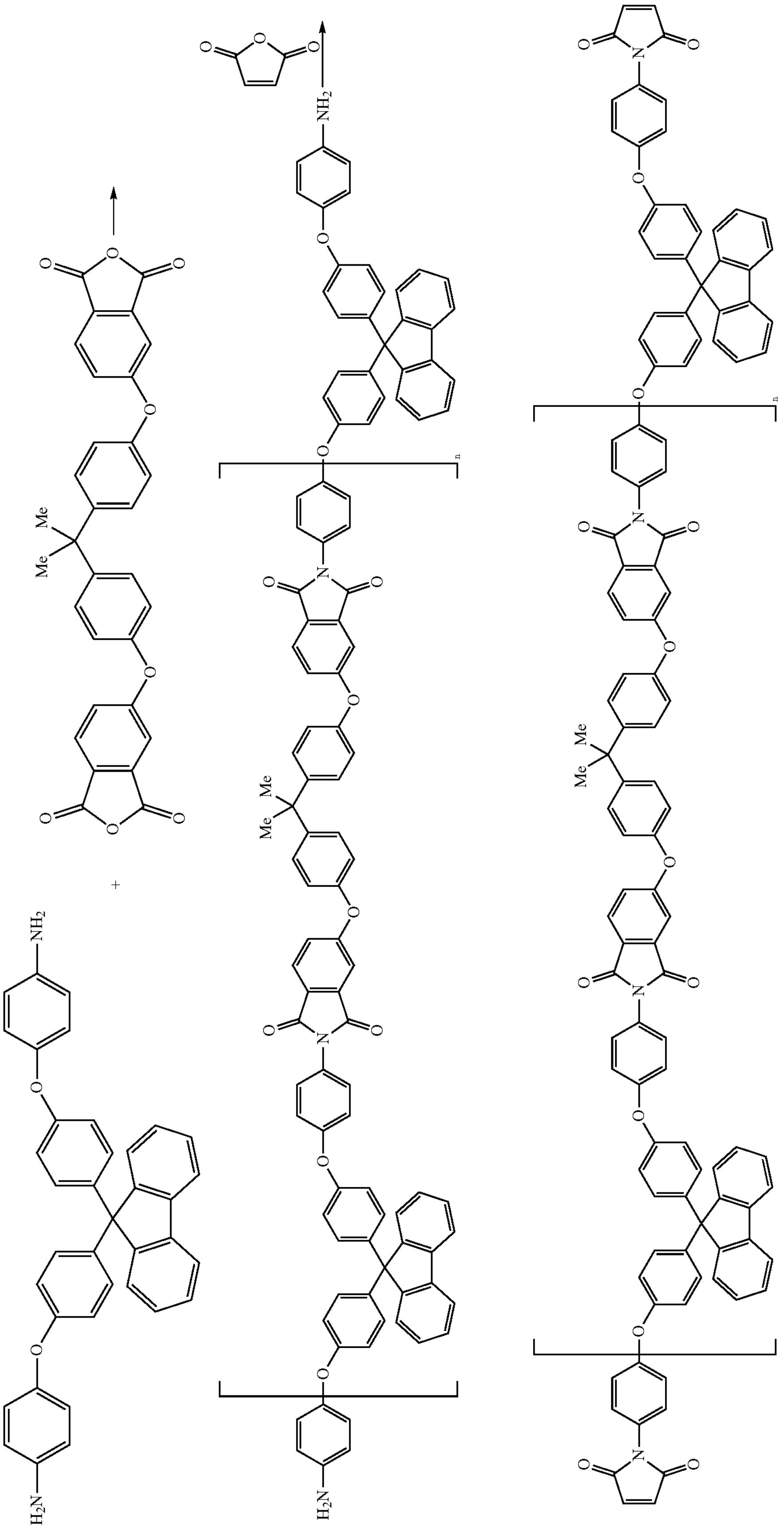
(4)
n ≈ 20 (Average value)

[Working Example 3](Production of Bismaleimide Compound 3, Reaction Formula 3)

An amic acid was synthesized by adding 21.55 g (52.5 mmol) of 2,2-bis[4-(4-aminophenoxy)phenyl]propane, 32.13 g (50.0 mmol) of 4,4'-(4,4'-isopropylidenediphenoxy) bis(phthalic anhydride) and 122 g of anisole to a 500 mL glass three-necked flask equipped with a stirrer, a Dean-Stark apparatus, a cooling condenser and a thermometer, and then by stirring them at 70° C. for 2 hours. Next, the temperature was directly raised to 150° C., where stirring was performed for 5 hours while distilling away water generated as a by-product, thereby synthesizing a polyimide compound.

Next, 0.54 g (5.5 mmol) of maleic anhydride was added to the flask containing the polyimide solution that had been cooled to room temperature, where the polyimide solution was stirred at room temperature for an hour to synthesize an amic acid. Next, the temperature was directly raised to 150° C., where stirring was performed for 6 hours while distilling away water generated as a by-product, thereby obtaining a target bismaleimide compound 3 (number average molecular weight: 33,000) represented by a formula (5) of the following reaction formula 3 as a yellow brown varnish.

(Reaction formula 3)
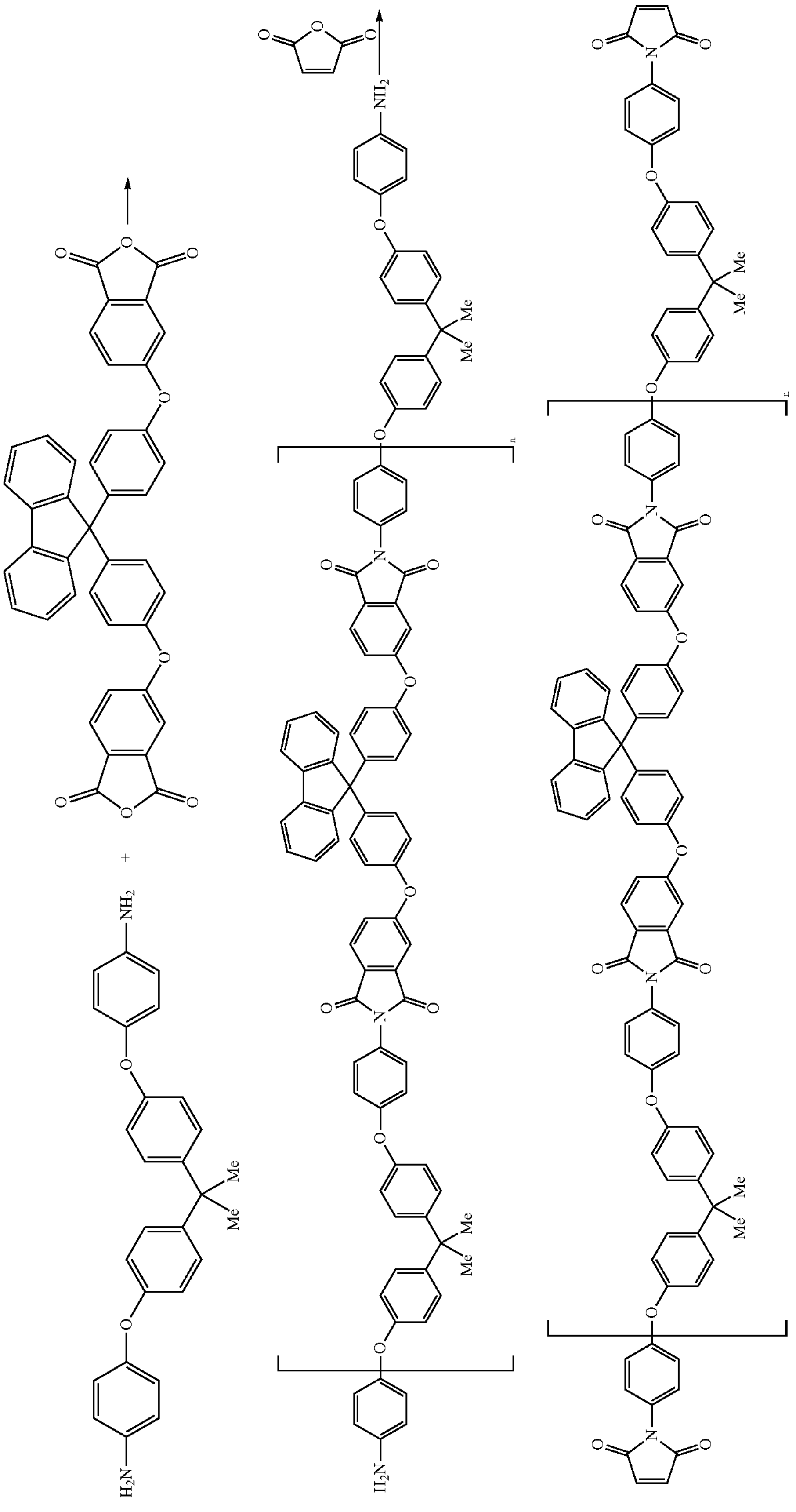
(5)
n ≈ 32 (Average value)

[Working Example 4](Production of Bismaleimide Compound 4, Reaction Formula 4)

An amic acid was synthesized by adding 31.96 g (60.0 mmol) of 9,9-bis[4-(4-aminophenoxy)phenyl]fluorene, 32.13 g (50.0 mmol) of 9,9-bis[4-(3,4-dicarboxyphenoxy)phenyl]fluorene dianhydride and 151 g of anisole to a 500 mL glass three-necked flask equipped with a stirrer, a Dean-Stark apparatus, a cooling condenser and a thermometer, and then by stirring them at 70° C. for 2 hours. Next, the temperature was directly raised to 150° C., where stirring was performed for 5 hours while distilling away water generated as a by-product, thereby synthesizing a polyimide compound.

Next, 2.16 g (22.0 mmol) of maleic anhydride was added to the flask containing the polyimide solution that had been cooled to room temperature, where the polyimide solution was stirred at room temperature for an hour to synthesize an amic acid. Next, the temperature was directly raised to 150° C., where stirring was performed for 6 hours while distilling away water generated as a by-product, thereby obtaining a target bismaleimide compound 4 (number average molecular weight: 11,000) represented by a formula (6) of the following reaction formula 4 as a brown varnish.

(Reaction formula 4)
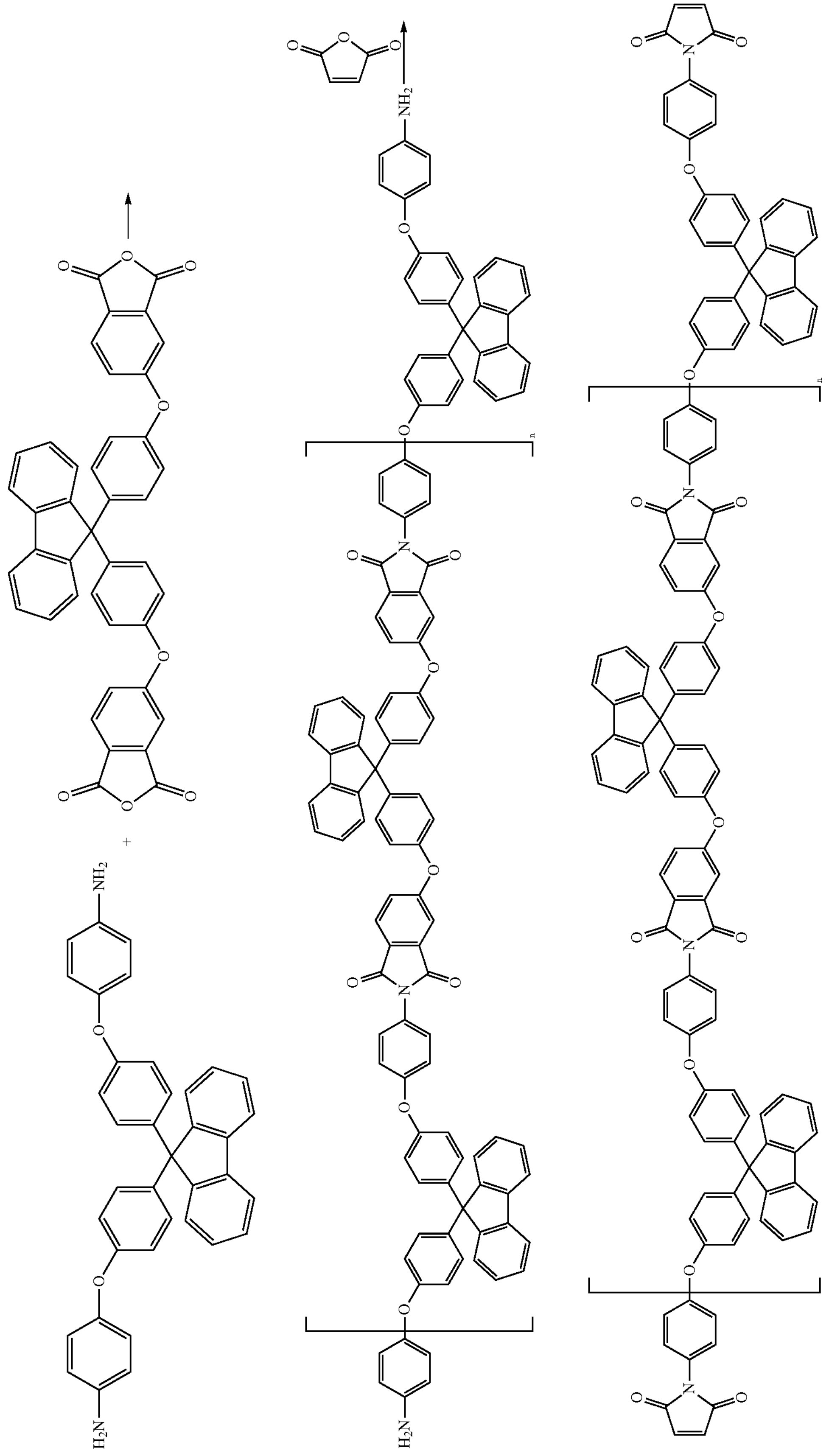
(6)
n ≈ 9 (Average value)

[Comparative Example 1](Production of Bismaleimide Compound 5, Reaction Formula 5)

An amic acid was synthesized by adding 42.93 g (105 mmol) of 2,2-bis[4-(4-aminophenoxy)phenyl]propane, 52.05 g (100 mmol) of 4,4'-(4,4'-isopropylidenediphenoxy) bis(phthalic anhydride) and 171 g of anisole to a 500 mL glass three-necked flask equipped with a stirrer, a Dean-Stark apparatus, a cooling condenser and a thermometer, and then by stirring them at 70° C. for 2 hours. Next, the temperature was directly raised to 150° C., where stirring was performed for 5 hours while distilling away water generated as a by-product, thereby synthesizing a polyimide compound.

Next, 1.08 g (11 mmol) of maleic anhydride was added to the flask containing the polyimide solution that had been cooled to room temperature, where the polyimide solution was stirred at room temperature for an hour to synthesize an amic acid. Next, the temperature was directly raised to 150° C., where stirring was performed for 6 hours while distilling away water generated as a by-product, thereby obtaining a target bismaleimide compound 5 (number average molecular weight: 20,000) represented by a formula (7) of the following reaction formula 5 as a light yellow varnish.

(Reaction formula 5)
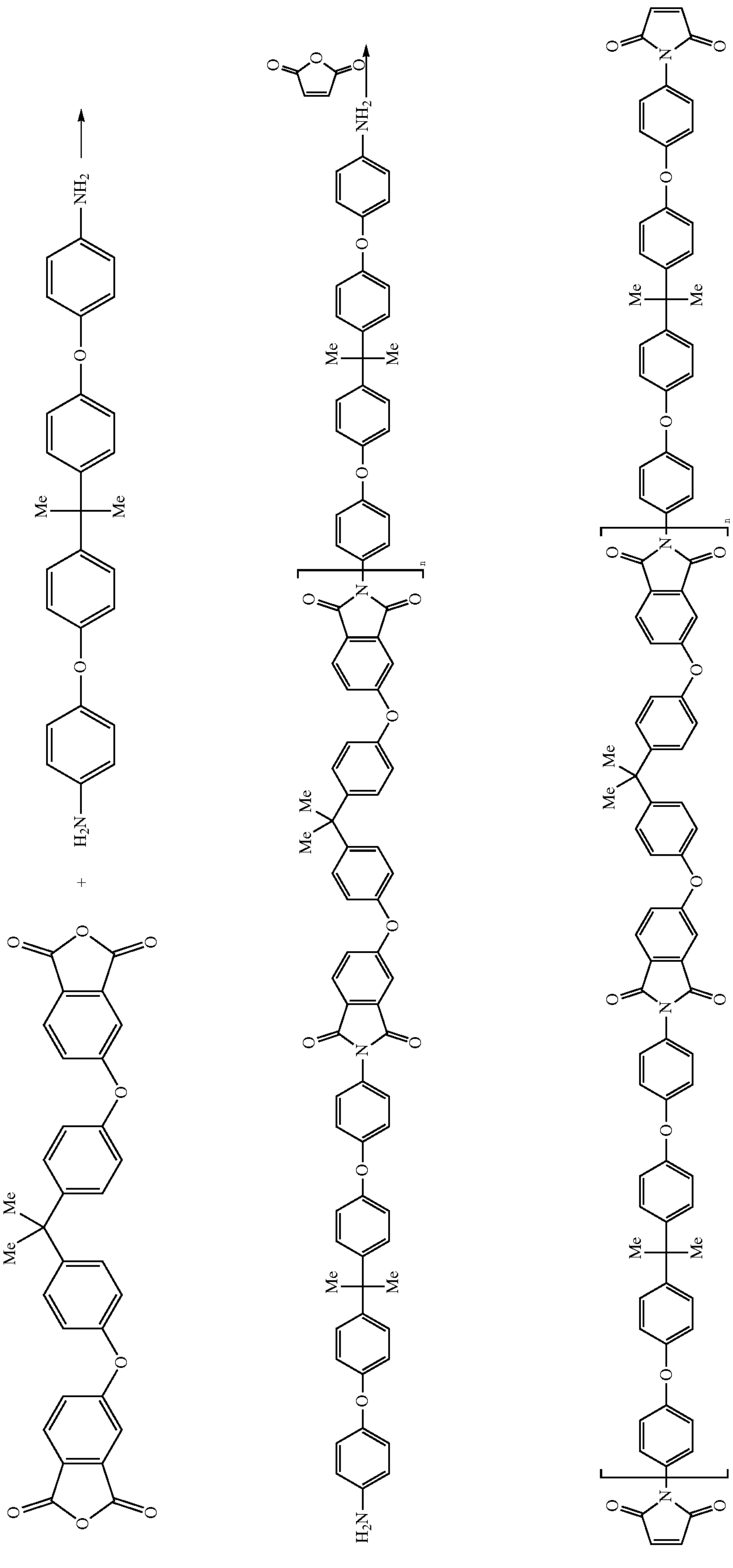
(7)
$n \approx 22$ (Average value)

The varnishes of the bismaleimide compounds 1 to 4 synthesized in the working examples 1 to 4 and the varnish of the bismaleimide compound 5 synthesized in the comparative example 1 were each adjusted to have a resin content of 50 g, followed by dissolving 1 g of dicumylperoxide therein to obtain a resin composition varnish.

Dielectric Properties (Relative Permittivity, Dielectric Tangent)

A roller coater was used to apply each resin composition varnish prepared above to a 100 μm thick AFLEX film so that the thickness of the resin composition after drying would be 30 μm, followed by drying them at 80° C. for 15 min to obtain an uncured resin film. Next, post curing was performed at 180° C. for 2 hours to obtain a film-shaped sample for dielectric property evaluation. Next, the AFLEX film was peeled away before subjecting the sample to measurement, and a network analyzer (E5063-2D5 by Keysight Technologies) and a stripline (by KEYCOM Corporation) were then connected to the sample to measure a relative permittivity and dielectric tangent of the film at a frequency of 10 GHz. The measurement results are shown in Table 1.

Glass-Transition Temperature (Tg)

TMA8140C manufactured by Rigaku Corporation was used to measure the glass-transition temperature of each film-shaped sample for dielectric property evaluation that had been produced as above. The measurement results are shown in Table 1.

TABLE 1

| | | Working example 1 | Working example 2 | Working example 3 | Working example 4 | Comparative example 1 |
|---|---|---|---|---|---|---|
| | | Resin | | | | |
| | | Bismaleimide compound 1 | Bismaleimide compound 2 | Bismaleimide compound 3 | Bismaleimide compound 4 | Bismaleimide compound 5 |
| Dielectric property (10 GHz) | Relative permittivity | 3.21 | 3.08 | 3.12 | 3.12 | 2.92 |
| | Dielectric tangent | 0.0058 | 0.0043 | 0.0052 | 0.0056 | 0.0046 |
| Glass-transition temperature (TMA) [° C.] | | 261 | 211 | 215 | 255 | 184 |

As is clear from Table 1, the cured products of the bismaleimide resin compositions of the working examples 1 to 4 each exhibited a significantly high glass-transition temperature as compared to the cured product of the bismaleimide resin composition of the comparative example 1.

Method for Producing Prepreg

A varnish was obtained by mixing 259 g of an anisole varnish of the bismaleimide compound 1 prepared in the working example 1, 2 g of dicumylperoxide, 133 g of a silica dispersion slurry (average particle size 0.5 μm, solid concentration 75% by mass, solvent: toluene, product name: 5SV-CT1 by ADMATECHS COMPANY LIMITED), and 111 g of anisole. A quartz glass cloth (thickness 90 μm, product name: SQX2116 by Shin-Etsu Chemical Co., Ltd.) was then impregnated with the varnish, followed by performing heating at 120° C. for 6 min to volatilize the solvent, thereby obtaining a prepreg (resin composition impregnation amount: 50% by mass).

Method for Producing Copper-Clad Laminate

A copper foil (surface roughness: 0.6 μm) having a thickness of 18 μm was placed on both surfaces of the prepreg obtained as above, followed by pressing them at 1.7 MPa and heating them at 180° C. for an hour to obtain a copper-clad laminate.

After removing the copper foil on both surfaces of the copper-clad laminate via etching, a network analyzer (E5063-2D5 by Keysight Technologies) and a stripline (by KEYCOM Corporation) were then connected to the prepreg to measure a relative permittivity and dielectric tangent thereof at a frequency of 10 GHz. Further, glass-transition temperature was measured using TMA8140C manufactured by Rigaku Corporation. The measurement results are shown in Table 2.

TABLE 2

| Resin | | Working example 1 |
|---|---|---|
| Dielectric property (10 GHz) | Relative permittivity | 2.88 |
| | Dielectric tangent | 0.0038 |
| Glass-transition temperature (TMA) [° C.] | | 248 |

As shown in Table 2, a material having excellent dielectric properties and an excellent heat resistance was able to be produced.

Method for Producing Printed-Wiring Board

Here, 10 pieces of the prepreg obtained as above and 11 pieces of 18 μm thick copper foil (surface roughness: 0.6 μm) were sequentially stacked together, followed by pressing them at 1.7 MPa and heating them at 180° C. for an hour to obtain a copper-clad laminate. A dry resist film (NIT430E by Nikko-Materials Co., Ltd.) having a thickness of 30 μm was then laminated on such copper-clad laminate via vacuum lamination, where a pressure and temperature were respectively 0.4 MPa and 80° C., and a lamination time was 60 sec. Next, a mask with a circuit pattern formed thereon was brought into contact with the laminated product, where UV irradiation was performed from above, and a development process was then carried out using an aqueous solution of sodium hydrogen carbonate. Next, etching was performed by dipping the product into an etching solution (H-1000A by Sunhayato Corp.), and a printed-wiring board with a circuit formed thereon was then obtained after performing washing with an aqueous solution of sodium hydroxide.

INDUSTRIAL APPLICABILITY

When molded into the shape of a film or substrate, the heat-curable bismaleimide resin composition of the present invention is capable of providing a cured product having excellent dielectric properties and an excellent heat resistance. Specifically, the heat-curable bismaleimide resin composition of the present invention is suitable for use in, for example, a multi-layered printed-wiring board that is used in an electronic device intended for high-frequency band, and thus requires an insulating material with excellent dielectric properties.

What is claimed is:

1. A heat-curable bismaleimide resin composition comprising:

(A) a bismaleimide compound represented by the following formula (1)

(1)

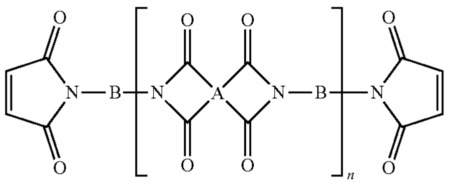

wherein A independently represents a tetravalent organic group having 4 to 200 carbon atoms, B independently represents a divalent organic group having 2 to 200 carbon atoms, n is 2 to 100, and wherein A and/or B has therein a fluorene frame represented by the following formula (2)

(2)

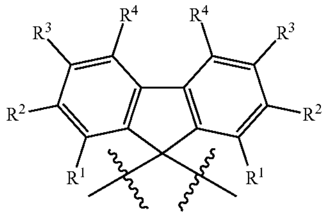

wherein each of $R^1$, $R^2$, $R^3$ and $R^4$ independently represents a hydrogen atom, an alkyl group having 1 to 5 carbon atoms, a (hetero) aryl group having 4 to 10 carbon atoms, a hydroxyl group, an alkoxy group, a halogeno group, an amino group, or a sulfenyl group; and (B) a reaction accelerator, wherein a cured product of the heat-curable bismaleimide resin composition has a glass-transition temperature of not lower than 200° C.

2. The heat-curable bismaleimide resin composition according to claim 1, wherein the reaction accelerator as the component (B) is a radical polymerization initiating catalyst, or an anionic polymerization initiating catalyst containing one or more kinds of atoms selected from nitrogen atoms and phosphorus atoms.

3. An uncured resin film comprised of the heat-curable bismaleimide resin composition according to claim 1.

4. A cured resin film comprised of a cured product of the heat-curable bismaleimide resin composition according to claim 1.

5. A prepreg having the heat-curable bismaleimide resin composition according to claim 1 and a fiber base material.

6. A substrate comprising the heat-curable bismaleimide resin composition according to claim 1.

7. An adhesive comprised of the heat-curable bismaleimide resin composition according to claim 1.

8. A semiconductor encapsulation material comprised of the heat-curable bismaleimide resin composition according to claim 1.

* * * * *